United States Patent
Aymonier et al.

(10) Patent No.: US 7,932,311 B2
(45) Date of Patent: Apr. 26, 2011

(54) SYNTHESIS OF PARTICLES IN DENDRITIC STRUCTURES

(75) Inventors: Cyril Aymonier, Begles (FR); François Cansell, Pessac (FR); Stefan Mecking, Constance (DE); Sandy Moisan, Bordeaux (FR); Victor Martinez, Constance (DE)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 92 days.

(21) Appl. No.: 12/158,722

(22) PCT Filed: Dec. 8, 2006

(86) PCT No.: PCT/FR2006/002691
§ 371 (c)(1),
(2), (4) Date: Nov. 24, 2008

(87) PCT Pub. No.: WO2007/080253
PCT Pub. Date: Jul. 19, 2007

(65) Prior Publication Data
US 2009/0093597 A1    Apr. 9, 2009

(30) Foreign Application Priority Data
Dec. 23, 2005  (FR) .................................. 05 13274

(51) Int. Cl.
*B32B 7/12*       (2006.01)
(52) U.S. Cl. ........ 524/186; 524/238; 524/239; 524/398; 524/399; 524/439; 524/440; 524/441

(58) Field of Classification Search ................... 524/398, 524/439, 440, 441, 186, 238, 239, 399
See application file for complete search history.

(56) References Cited

FOREIGN PATENT DOCUMENTS
WO    2005/054120 A2    6/2005

OTHER PUBLICATIONS

Crooks, R.M.; Zhao, M.; Sun, L.; Chechik, V.; Yeung, L.K.; Accounts of Chemical Research, vol. 34(3), Mar. 2001, p. 181-190.*
Kuo, P.L.; Liang, W.J.; Wang, F.Y.; Journal of Polymer Science: Part A: Polymer Chemistry, 2003(41), p. 1360-1370.*
Bao, C.; Jin, M.; Lu, R.; Zhang, T.; Zhao, Y.; Materials Chemistry and Physics, 2003(82), p. 812-817.*
Esumi, K.; Isono, R.; Yoshimura, T.; Langmuir, 2004(20), p. 237-243.*
Martinez, V.; Mecking, S.; Tassaing, T.; Besnard, M.; Moisan, S.; Cansell, F.; Aymonier, C.; Macromolecules, 2006(39), p. 3978-3979.*
Scott et al., "Characterization and Applications of Dendrimer-Encapsulated Nanoparticles," J. Phys. Chem. B, vol. 109, No. 2, pp. 692-704 (Jan. 20, 2005).
Cansell et al., "Review on materials science and supercritical fluids," Curr. Opin. on Solid State & Mater. Sci., vol. 7, No. 4-5, pp. 331-340 (Aug. 2003).

* cited by examiner

*Primary Examiner* — David Wu
*Assistant Examiner* — Robert Jones
(74) *Attorney, Agent, or Firm* — Young & Thompson

(57) ABSTRACT

The invention relates to a method of preparing a particle-based composition, comprising: (i) bringing into contact a mixture comprising a dendritic structure and a metal compound precursor in a fluid, under temperature and pressure conditions such that the mixture is not soluble in the fluid; and (ii) chemically converting the metal compound precursor.

18 Claims, 3 Drawing Sheets

SYNTHESIS OF PARTICLES IN DENDRITIC STRUCTURES

The invention relates to a process for the preparation of a composition based on particles and dendritic structures in fluid media, under pressure and at temperature, especially in supercritical fluid media, and to the compositions that can be obtained according to that process. The invention relates also to the use of those compositions, especially as catalysts in organic synthesis.

The invention relates also to dendritic structures that can be used for the preparation of the compositions according to the invention.

The conventional methods for synthesizing nanomaterials in dendritic structures (dendrimers and hyperbranched polymers), which may or may not be functionalized by hydrophilic, hydrophobic or fluorinated molecules, have been presented in numerous publications (Wilson et al., 2005; Schlotterbeck et al., 2004; Garcia-Bernabe et al., 2004). According to this approach, a first step concerns the solubilization of the dendritic structure and the reagents in an appropriate solvent (polar, non-polar or fluorinated), then there is a step of diffusing the reagents in the core of the dendritic structure and then a final step, generally of reduction. Principally, metal nanoparticles have been synthesized.

The synthesis of functional nanomaterials in supercritical fluid media is generally effected by a chemical transformation or a physical transformation (Cansell et al., 2003; Jung et al., 2001). The synthesis of functional nanoparticles by chemical transformation in supercritical fluid media is effected in the presence of organic stabilization and functionalization agents and precursors or metal salts soluble in the fluid under the conditions studied:

synthesis by chemical transformation in the presence of a functionalization agent (Cansell et al., 2003; Korgel et al., 2003; Adischiri et al., 2005; Holmes et al., 2003; Ye et al., 2003; McLeod et al., 2004; Shah et al., 2004).

synthesis in inverse micelles (Holmes et al., 2003; Ye et al., 2003).

A large number of studies have also been carried out on the synthesis of nanoparticles, principally metal nanoparticles, in supercritical fluid media in polymer matrices (Satoshi et al., 2004). The polymer matrices are composed of macromolecular chains below their glass transition temperature and not of dendritic structures. The supercritical fluid permits the impregnation of the polymer matrix with the reagents, of the precursor or metal salt type, which will enable the nanoparticles to be synthesized; these reagents must be soluble in the supercritical fluid under the conditions studied. Subsequently, the nanoparticles are generally formed by a thermal treatment or by a reduction in the presence of hydrogen, for example.

Dendrimers have been used in supercritical fluid media principally for catalysis (Wilson et al., 2005; Fahlman B. D., 2004; Dai L., 2005; Goetheer et al., 2000), the synthesis of the nanoparticles in the dendrimer having been effected by conventional methods.

The methods conventionally used, especially methods by soft chemistry, to synthesize nanoparticles in dendritic structures are not versatile (Scott et al., 2005; Garcia-Bernabé, 2004). It is necessary to adapt a process (choice of solvent, choice of reagents and determination of the synthesis parameters, such as the kinetics of the reaction used) in accordance with the system to be synthesized, the choice of the synthesis method having to take into account both the properties of the dendritic structure used and the nanoparticles to be synthesized. Depending on the solvent used, the choice of reagents will be more or less difficult; complicated molecules can be used with a risk of polluting the final particle. As regards the synthesis of the particle, the conventional systems are also limited by:

the nature of the nanoparticle: principally, the synthesis of metals and semiconductors is encountered in the literature. It is more difficult to synthesize oxides (by co-precipitation) and impossible to synthesize nitrides.

the size and size distribution are generally controlled by the characteristics of the core of the dendritic structure. In order to adjust the size, it is necessary to synthesize new dendritic structures.

the morphology will depend on the nature of the nanoparticle synthesized, the properties of the dendritic structures and the kinetics of the reaction used.

The object of the invention is to propose a versatile process enabling different types of nanomaterial to be prepared from the same system, especially from the same fluid. That object and others are achieved by the invention.

According to a first aspect, the invention relates to a process for the preparation of a particle-based composition, comprising:

(i) bringing a mixture comprising a dendritic structure and a metal compound precursor into contact with a fluid under temperature and pressure conditions such that the mixture is not soluble in the fluid, and (ii) the chemical transformation of the metal compound precursor.

"Particle-based composition" means a composition comprising particles based on one or more metal compound(s) in association with identical or different dendritic structures.

In the following, particle (P) will denote particles that are based on one or more metal compound(s) and that are not associated with dendritic structures.

This process has numerous advantages. In particular, it is especially versatile and permits access to various materials, such as, especially, metals, semiconductors, oxides, nitrides and carbides.

It is also possible to synthesize particles from the dendritic structures described in the scientific literature or available commercially, optionally dendritic structures modified by molecules or macromolecules, such as hydrophilic or hydrophobic, especially fluorinated, polymer matrices. These dendritic structures advantageously enable the solubility of the metal compound particles (P) in all types of media (hydrophilic or hydrophobic) to be adjusted.

This process also enables the size, the morphology and/or the structure of the particles to be controlled. The size of the particles can especially be controlled by the kinetics of the reaction used in the fluid under pressure or at temperature. It also provides the possibility of recovering functional particles in the form of a dry powder or a paste, depending on the starting dendritic structure, which is generally unpolluted and redispersible in the medium determined by the application.

Finally, this process is a versatile process which can advantageously be applied on an industrial scale.

Dendritic Structures

In the context of the present description, "dendritic structure" means a macromolecule having a branched structure which can be obtained by polymerization (or co-polymerization) of organic monomer units having a functionality greater than 2. The chemical functions present at the ends of the branches of such a structure are referred to by the expression "terminal functions". By definition, the number of terminal functions on a dendritic polymer is greater than 2.

In the context of the description, the dendritic structures may be dendrimers or hyperbranched polymers.

Dendrimers are macromolecules composed of monomers which combine with each other in accordance with an arborescent process.

Dendrimers, also called "cascade molecules", are highly branched functional polymers of defined structure. These macromolecules are in fact polymers since they are based on the association of repeating units. However, dendrimers differ fundamentally from conventional polymers in as much as they have their own properties owing to their arborescent construction. The molecular weight and the architecture of dendrimers can be precisely controlled.

Dendrimers are constructed step by step by the iteration of a reaction sequence allowing the multiplication of each repeating unit and terminal functions. Each reaction sequence forms a so-called "new generation". The arborescent construction is effected by repeating a reaction sequence, which enables a new generation and an increasing number of identical branches and therefore of terminal functions to be obtained at the end of each reaction cycle. After a few generations, the dendrimer generally assumes a globular form which is highly branched and multi-functionalized owing to the large number of terminal functions present at the periphery.

In the context of the present invention, "hyperbranched polymers" means polydispersed polymer materials constituted by the association of repeating units such as those of which dendrimers are composed, and which therefore have a structure comparable to that of dendrimers. Hyperbranched polymers differ from dendrimers in that their structure is more polydispersed and less regular. They are generally easier and less expensive to synthesize than are dendrimers.

Examples of dendrimers or hyperbranched polymers are especially poly(amidoamines) (PAMAM), polyethylene imines (PEI), poly(propyleneimines) (PPI), and polypropyleneimine dotriacontaamine dendrimers (DAB), which are commercially available, for example, from Sigma Aldrich.

Other examples of hyperbranched polymers are especially the polyphenylenes described by Y. H. Kim and O. W. Webster, the polyamides or the polyesters having a dendritic structure which are described in the applications WO 92/08749 or WO 97/26294, the polyglycerols or also the polymers described in the applications WO 93/09162, WO 95/06080 or WO 95/06081.

The dendritic structures can be modified.

Preferably, the dendritic structures according to the invention are dendrimers or hyperbranched polymers comprising secondary amine (—NH—) or primary amine (—NH$_2$) functions, hydroxyl functions (—OH), carboxylic acid functions (—COOH), halogen functions (Hal), such as Cl, Br or I, thiol functions (SH), more preferably amine or hydroxyl functions.

For these amine or hydroxyl functions may advantageously be coupled to molecules comprising functions of the carbonyl (CO) type, such as (—COOH); (—COHal); or ester, for example (—COOAlk); in order to lead to the production of modified dendrimers.

In the context of the present description, "modified dendritic structure" means structures in which all or some of the functions, especially terminal functions, are bonded, in a covalent or non-covalent manner, by ionic or Van der Waals interactions, to molecules or macromolecules, which may be hydrophilic or hydrophobic. These modified dendritic structures therefore comprise a "core" formed from the initial dendrimer or hyperbranched polymer and a "cortex" formed by the hydrophilic or hydrophobic molecules, including, especially, fluorinated molecules.

"Hydrophilic molecules or macromolecules" means molecules that are soluble in water and polar solvents. They typically comprise one or more polar functions, such as OH, NH$_2$, OAlk, COOH. Examples of hydrophilic molecules that can be used according to the invention are especially oligo- or polysaccharides, for example cellulose or dextran, polyethers (polyethylene glycol), polyalcohols (polyvinyl alcohol), polyacrylates (polycarboxylates) and molecules having anionic or cationic functions, such as sulphate, phosphate or ammonium functions.

"Hydrophobic molecules or macromolecules" means water-insoluble, electrically neutral, non-polar molecules. Hydrophobic molecules that can be used according to the invention generally comprise one or more long linear or branched aliphatic chains that are saturated (alkyls) or unsaturated (alkenyls or alkynyls), especially aliphatic chains having two or more carbon atoms, especially $C_5$-$C_{20}$ aliphatic chains. Examples of hydrophobic molecules that can be used according to the invention are especially fatty acids or esters of fatty acids which are saturated or unsaturated.

"Fluorinated molecule" means a hydrophobic compound comprising one or more poly- or perfluorinated, saturated or unsaturated, linear or branched aliphatic chains, especially aliphatic chains having two or more carbon atoms, especially $C_5$-$C_{20}$ aliphatic chains.

According to the present invention, the alkyl or "Alk" groups represent straight-chain or branched-chain saturated hydrocarbon groups comprising from 1 to 30 carbon atoms, preferably from 5 to 20 carbon atoms. When they are linear, special mention may be made of the groups methyl, ethyl, propyl, butyl, pentyl, hexyl, octyl, nonyl, decyl, dodecyl, hexadecyl and octadecyl.

When they are branched or substituted by one or more alkyl radicals, special mention may be made of the radicals isopropyl, tert-butyl, 2-ethylhexyl, 2-methylbutyl, 2-methylpentyl, 1-methylpentyl and 3-methylheptyl.

The hydrophilic or hydrophobic molecules that can be used according to the invention also comprise at least one function capable of reacting with at least one of the functions of the dendritic structure, especially with the terminal functions, which are generally readily accessible.

Examples of such functions are especially the functions —COOH, —COOAlk, —OH, —NH$_2$.

As examples of covalent bonds that can be formed between the dendritic structure and the hydrophilic or hydrophobic molecules, special mention may be made of the amide bonds —(C=O)—NH—, —NH—(C=O), and the ester bonds —(C=O)—O—, —O—(C=O)—, —C—O—C—, —C—C—.

As examples of hydrophilic or hydrophobic molecules that can be used according to the invention, more particular mention may be made of:

poly- or perfluoroalkanoic acids of formula RfCOOH, where Rf represents a poly- or perfluorinated Alk group, especially 2H,2H,3H,3H-perfluoroundecanoic acid;

alkylcarboxylic acids AlkCOOH, where Alk is a $C_2$-$C_{20}$ alkyl group;

polyoxyalkylene glycols or the ethers thereof, such as tetraethylene glycol monomethyl ether (HO$_2$HC—CH$_2$—(OCH$_2$CH$_2$)$_3$—OCH$_3$), polyethylene glycol.

Preferably, the molecules or macromolecules bonded to the surface of the dendritic structures have a molecular mass ranging from 50 to 10000 g/mol, and more preferably from 200 to 1000 g/mol.

The modified dendritic structures that can be used according to the invention can be prepared by applying or adapting any method known per se and/or within the competence of the person skilled in the art that permits the grafting of hydrophilic, hydrophobic or fluorinated molecules, especially those described by Larock (*Comprehensive Organic Transformations,* VCH Publishers, 1989) or by applying or adapting the processes described in the following Examples (Rainer Haag, 2004; Stephan Mecking, 2002 and 2003; E. Meyer, 1996; Desimone J. M., 1997; R. M. Crooks, 1999).

Metal Compound Precursor

"Metal compound precursor" means a metal compound comprising a metal element $M^{n1}$ in a state of oxidation n1 greater than or equal to 0, generally from +1 to +6 depending on the nature of the metal element, which, after chemical transformation, leads to a compound comprising the corresponding metal element $M^{n2}$ in the state of oxidation n2, which may be identical to or different from n1.

For example, in the case where the chemical transformation is a reduction reaction, the degree of oxidation n2 of the metal compound $M^{n2}$ obtained will be less than or equal to the degree of oxidation n1 of the precursor $Mn^{n1}$.

The metal element M is not critical and may be any metal element from groups 1 to 15 of the periodic table of elements. The expression "metal element" used here also includes boron, B. Examples of metal elements include, in the periodic table of elements, the elements of group 1 (for example Li, Na, K), the elements of group 2 (for example Mg, Ca, Sr, Ba), the elements of group 3 (for example Sc, lanthanoid elements, actinoid elements), the elements of group 4 (for example Ti, Zr, Hf, the elements of group 5 (for example V), the elements of group 6 (for example Cr, Mo, W), the elements of group 7 (for example Mn), the elements of group 8 (for example Fe, Ru), the elements of group 9 (for example Co, Rh), the elements of group 10 (for example Ni, Pd, Pt), the elements of group 11 (for example Cu, Ag and Au), the elements of group 12 (for example Zn), the elements of group 13 (for example B, Al, In), the elements of group 14 (for example Sn, Pb) and the elements of group 15 (for example Sb, Bi).

By extension, the expression "metal element" also includes, in the context of the present exposition, the elements of group 16 (for example S and Se).

Preferred metal elements include the transition metal elements (the elements of groups 3 to 12 of the periodic table of elements). Of these, the elements of groups 5 to 11 of the periodic table of elements are preferred.

The valency of the metal element is not critical and may be from 0 to 6, and is approximately 2 or 3 in many cases.

The metal compounds and the precursors thereof include, but without being limited thereto, elemental substances, hydroxides, oxides (including complex oxides), halides (fluorides, chlorides, bromides and iodides), the salts of oxo acids (for example nitrates, sulphates, phosphates, borates and carbonates), oxo acids, isopolyacids, heteropolyacids and other mineral compounds of the metal elements mentioned above; the salts of organic acids (for example the salts of acetic acid, propionic acid, hydrocyanic acid, naphthenic acid and stearic acid), the complexes and other organic compounds of the metal elements. Ligands constituting the complexes include OH (hydroxo), alkoxy groups (for example, the groups methoxy, ethoxy, propoxy and butoxy), acyl groups (for example, acetyl and propionyl groups), alkoxycarbonyl groups (for example, methoxycarbonyl and ethoxycarbonyl groups), acetylacetonate, the cyclopentadienyl group, halogen atoms (for example, chlorine and bromine atoms), CO, CN, the oxygen atom, $H_2O$ (aquo), phosphines (for example, triphenylphosphine and other triarylphosphines), and other compounds of phosphorus, $NH_3$ (amine), NO, $NO_2$ (nitro), $NO_3$ (nitrato), ethylenediamine, diethylenetriamine, pyridine, phenanthroline and other compounds containing a nitrogen atom.

Specific examples of metal compounds and precursors thereof that can be used according to the invention include, taking cobalt compounds as examples, cobalt hydroxide, cobalt oxide, cobalt chloride, cobalt bromide, cobalt nitrate, cobalt sulphate, cobalt phosphate, and other mineral compounds; cobalt acetate, cobalt naphthenate, cobalt stearate, and other salts of organic acids; cobalt acetylacetonate and other complexes, and other divalent or trivalent cobalt compounds.

As examples of vanadium compounds and the precursors thereof that can be used according to the invention, mention may be made of vanadium hydroxide, vanadium oxide, vanadium chloride, vanadyl chloride, vanadium sulphate, vanadyl sulphate, sodium vanadate, and other mineral compounds; vanadium acetylacetonate, vanadyl acetylacetonate, and other complexes, and other compounds of vanadium having a valency of from 2 to 5.

As examples of compounds of palladium or the precursors thereof that can be used according to the invention, special mention may be made of the mineral compounds of palladium, such as palladium chloride, palladium complexes, such as palladium acetylacetonate, palladium acetate, palladium hexafluoroacetylacetonate or also palladium nitrate.

As examples of silver compounds or the precursors thereof that can be used according to the invention, mention may be made of the mineral compounds of silver, such as silver chloride, silver organometal complexes, such as silver acetylacetonate (Ag(acac)), silver acetate, silver nitrate or also silver citrate.

Other examples of compounds of metal elements or the precursors thereof include the compounds corresponding to the above-mentioned cobalt, vanadium, palladium or silver compounds. Each of the metal compound precursors may be used alone or in combination.

Preferably, the precursor is a palladium or silver compound.

The metal compound precursors used according to the process of the invention are preferably selected from the precursors of metals, of semiconductor materials, of metal oxides or of nitrides.

The metal compounds obtained by chemical transformation starting from the precursors according to the process of the invention are especially metals, metal oxides, semiconductor materials, nitrides and carbides. The semiconductor materials include the metal elements belonging to group IV, such as silicon, germanium, grey tin ($\alpha$-Sn); composite semiconductors, in particular compounds comprising an element of group III with an element of group V, for example gallium arsenide (GaAs), gallium nitride (GaN), gallium antimonide (GaSb), gallium phosphide (GaP), indium arsenide (InAs), indium phosphide (InP), indium antimonide (InSb), aluminium antimonide (AlSb), aluminium phosphide (AlP), aluminium arsenide (AlAs); metal compounds comprising an element of group II with an element of group V, such as: CdTe, CdS, ZnSe, ZnTe, MgS; metal compounds comprising an element of group I with an element of group VII, such as: CuBr, CuCl, CuI.

Examples of metal nitrides that can be prepared according to the process of the invention include nitrides of transition metals, especially elements of group III, for example GaN, AlN, InN, and of group IV, for example TiN, Zr, N, HfN, $Si_3N_4$, of group V, for example VN, NbN, TaN, or also of group VI, for example CrN, $Cr_2N$ or MnN.

These materials have numerous properties, especially mechanical, chemical or optical properties, which can be exploited for various technological applications. In general, they have the particular feature of being refractory and they have thermal conductivities similar to those of metals. They may also have, in particular, a high degree of resistance to abrasion, very advantageous optical selectivity, a high degree of stability in respect of chemical attack and reducing environments, or also catalytic properties similar to those of the noble metals.

As examples of metal oxides that can be prepared according to the invention, mention may be made of iron oxides, especially ferrites, in particular magnetite ($Fe_3O_4$) and maghemite ($\gamma$-$Fe_2O_3$). Nanoparticles having a physiochemical composition between magnetite and maghemite are superparamagnetic substances and can be used especially as contrast agents for magnetic resonance imagery.

Chemical Transformation

In a step (ii) of the process of the invention, the metal compound precursor undergoes a chemical transformation which may be a thermolysis, an oxidation-reduction reaction, a sol-gel reaction or a solvothermal reaction.

Preferably, the chemical transformation comprises an oxidation-reduction reaction. The mixture comprising a dendritic structure and a metal compound precursor is then brought into contact with a reducing or oxidizing agent in the fluid.

The reducing agent is not critical and can be chosen from conventional reagents. Examples of reducing agents that can be used according to the invention are especially hydrogen, metal hydrides, such as alkali or alkaline-earth metal hydrides, for example sodium hydride (NaH) or potassium hydride (KH), $NaBH_4$, superhydrides, such as $NaBHL_3$, L being an organic ligand, or also CO, hydrogen being especially preferred.

Likewise, the oxidizing agent is not critical and can be chosen from oxygen, hydrogen peroxide and peracids, oxygen being especially preferred.

In general, reducing or oxidizing agents that are in the gaseous state under the temperature and pressure conditions of the process according to the invention are preferred. For they can be readily removed from the reaction medium at the end of the reaction, especially without an additional purification step.

The Fluid

In the context of the present exposition, "fluid" means a fluid under pressure and at temperature, preferably under supercritical conditions.

"Fluid under pressure" means a fluid at a pressure higher than 0.1 MPa, more preferably higher than 1 MPa, more preferably from 10 to 30 MPa.

"Fluid at temperature" means a fluid at a temperature higher than ambient temperature, more preferably higher than the critical temperature of the fluid, preferably from 80° to 250° C.

Supercritical fluids represent a phase or a pseudo-phase having the characteristics both of a liquid and of a gas. In the context of the description, "supercritical fluid" means a fluid which is under temperature and pressure conditions higher than the critical temperature (Tc) and the critical pressure (Pc), respectively.

Examples of supercritical fluids that can be used according to the invention are especially carbon dioxide ($CO_2$), methane, ethane, propane, ethylene, krypton, xenon, ethanol, water, acetone, ammonia, $N_2O$, $CHF_3$ or a mixture thereof, $CO_2$ being especially preferred.

Preferably, the fluid comprises $CO_2$.

$CO_2$ is said to be in the supercritical state if the temperature is higher than 31° C. and its pressure is higher than $73.8 \times 10^5$ Pa.

Under these conditions, $CO_2$ both exhibits the properties of a gas, such as its great diffusion, and acquires those of a liquid, such as its density which is 0.7 kg/cm³ at the supercritical point. Supercritical $CO_2$ has a number of advantages, including, in particular, the possibility of varying the solvent power under moderate temperature conditions (30° C.), and a great variation in that solvent power for small variations in pressure. Furthermore, supercritical $CO_2$ leaves no toxic residue because it returns to the gaseous state under conditions of ambient temperature and pressure. $CO_2$ is also a recyclable, inexpensive, plentiful, non-flammable, non-toxic gas.

In the context of the present invention, the temperature and the pressure of the fluid are selected in such a manner that the mixture comprising the dendritic structure and the metal compound precursor is not soluble in the fluid.

This is made possible in as much as, in general, the solubility of a chemical compound in a fluid is closely linked, on the one hand, to the nature of the compound and, on the other hand, to the density of the fluid, which depends on the nature of the fluid and the temperature and pressure conditions. By adapting the pressure and temperature conditions of the fluid, it is thus possible to control the solubility of the reagents in the medium and to create conditions in which the reagents are poorly soluble or even insoluble.

"Insoluble" means a solubility of the mixture in the fluid lower than $10^{-2}$ g/g and preferably lower than $10^{-4}$ g/g (the ratio g/g being expressed in grams (g) of solute/per gram (g) of fluid).

As regards the mixtures in which the dendritic structures have a fluorinated "cortex", it is generally accepted that fluorinated molecules are soluble in supercritical $CO_2$. On the other hand, the solubility in supercritical $CO_2$ of dendritic structures having a fluorinated cortex will depend on the nature of the cortex, on the ratio of the mass of the cortex to the mass of the core and on the density of the supercritical fluid. It is found that these molecules will be soluble only for high densities of $CO_2$ of the order of 0.9-1.

When a chemical agent bringing about the chemical transformation is used in step (ii), for example a reducing or oxidizing agent, it may or may not be soluble in the fluid. Preferably, it is soluble so that it can diffuse within the mixture comprising the dendritic structure and the metal compound precursor.

Without wishing to be bound by any particular theory, the inventors have observed that the fluid enables the mixture to be swollen; it is thus possible to adjust the viscosity of the mixture on the basis of the pressure-temperature parameters. Under these conditions, a chemical reaction will initiate the transformation of the precursor and bring about the formation of the particles, the control of the size of which will be closely linked to the viscosity of the medium. This has been demonstrated owing to the inventors' knowledge of the process for the synthesis of nanomaterials in supercritical fluid media (Cansell et al., 2004). For, as of a specific size, the particles no longer grow and will be stabilized by the dendritic structure, more especially by specific interactions with certain atoms which make up the core of the dendritic structure of the type S, N, O, . . .

As examples of mixtures of dendritic structures and precursors that can be used according to the invention, mention may be made of those comprising Pd (acac)$_2$ and a dendritic structure selected from PEI-$COCH_2CH_2Rf$, PEI-CO—$CH_2$—$CH_2$—($OCH_2$—$CH_2$)$_3$—$OCH_3$ or also DAB-CO—$CH_2CH_2Rf$.

Preferably, the molar ratio precursor/dendritic structure according to the process is greater than or equal to 1, preferably from 10 to 200.

The duration of the step for the chemical transformation of the precursor into a metal compound may vary greatly depending on the kinetics of the reaction.

Typically, the transformation takes place for a period longer than 1 minute and generally for 15 minutes to 5 hours.

Several particles stabilized by a single dendritic structure may be formed in accordance with the size, architecture and chemical composition of the dendritic structure. The composition of the dendritic structure may also influence the interaction with the metal compound particle. Conversely, the product obtained according to the process may comprise several dendritic structures per metal compound particle. There may also be one particle per dendritic structure.

The process according to the invention preferably comprises the recovery of the particle-based composition obtained. The recovery can be carried out in accordance with conventional methods. By way of example, in the case where the chemical transformation agent is a gas, at the end of the reaction, the supercritical or gaseous fluid and the chemical transformation agent can be removed from the reaction vessel and a dry powder is recovered. During decompression, the temperature is preferably adjusted in such a manner as to prevent the supercritical or gaseous fluid from passing into the liquid state.

According to another aspect, the invention relates to the particle-based compositions that can be obtained according to the process of the invention.

The particles (P) generally have an average diameter of from 1 nm to 1 μm, preferably from 1 nm to 100 nm, and more preferably from 1 to 10 nm. The average diameter of the particles (P) according to the invention refers to the diameter measured by transmission electron microscopy (TEM) (especially by means of a high-resolution scanning electron microscope (FESEM)). More precisely, this average diameter is calculated by adding up the average diameters of a population of particles and dividing by the number of particles making up the population.

The particles (P) so obtained may be composite materials and may have different morphologies (for example, a spherical, sheet-like or rhombohedric shape).

According to another aspect, the invention relates to the use of the particle-based compositions in the fields of electronics, catalysis, medicine, biology, optics, cosmetics and nanocomposites.

In particular, the compositions based on particles (P) according to the invention can be used:
for synthesis in organic chemistry, especially for catalysis, for example for bi-phase colloidal catalysis;
for coating surfaces, for example for producing a hydrophobic and/or antibacterial deposit on a surface;
as a contrast agent for medical imagery, especially for MRI, when the metal compound particle has magnetic properties, especially superparamagnetic properties.

In this last case, it is particularly preferred to modify the dendritic structures with biocompatible hydrophilic molecules or macromolecules, such as PEG, in order to prevent the immune system from recognizing the particle (P).

According to another aspect, the invention relates to a dendritic structure of the formula (I):

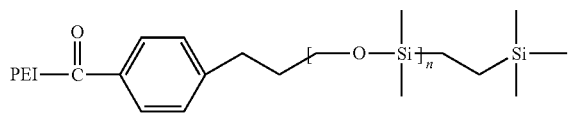

in which PEI denotes polyethylene imine and n is an integer, preferably ranging from 3 to 5.

These dendritic structures can be used as synthesis intermediates for the preparation of the compositions according to the invention.

FIGURES

FIG. 1 represents the experimental arrangement. It is composed of the devices for introducing the fluid (cryostat and high-pressure pump) (1), the synthesis reactor equipped with a pressure control (digital pressure sensor, pressure gauge, rupture disc and discarding device) and a temperature-regulating system (2) (heating cover, thermocouples). The system operates in closed or semi-continuous mode.

EXAMPLES

Figure 1:
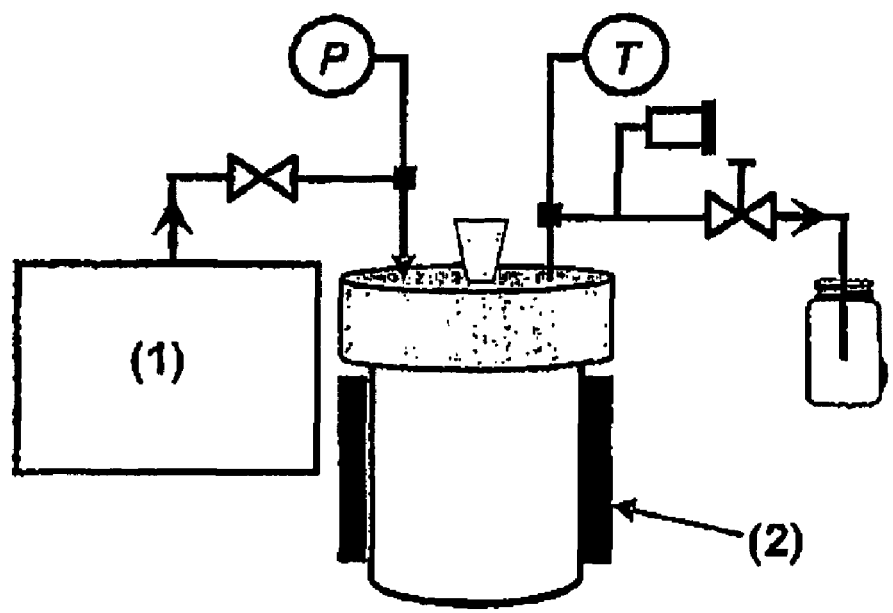

The following Examples illustrate the invention without, however, limiting it.

The starting products used are known products or products prepared in accordance with known methods.

Equipment and Methods
TEM: Jeol 2000 FX;
XPS: Escalab 220 IXL (Vacuum Generator);
XRD: Conventional X-ray Powder Diffraction Cu—K$_\alpha$ radiation.
The reagents PEI, DAB were supplied by the company.

Example 1

Nanoparticles of Pd and Ag in Polyethyleneimine Modified with Fluorinated Molecules a) Synthesis of the Dendritic Structure In this Example, the dendritic structure used is a hyperbranched polymer (core-polyethyleneimine (PEI) of molar mass 5000 g/mol (PEI5k)) modified by fluorinated molecules (cortex—"COCH$_2$CH$_2$Rf" with Rf=-(CF$_2$)$_7$CF$_3$).

2H,2H,3H,3H-perfluoroundecanoic acid (1.06 g, 2.16 mmol), dissolved in THF (10 ml), is added slowly to a solution of carbonyldiimidazole (338 mg, 2.09 mmol) in THF (10 ml). The mixture is agitated for 1 hour at ambient temperature. A stream of argon is used to remove the CO$_2$ produced. Subsequently, the mixture is transferred to a reaction vessel containing the polyethyleneimine (293 mg, 2.09 mmol of terminal "amino" groups). The reaction mixture is heated at 40° C. overnight. The volume of the solvent is reduced to 10 ml and 50 ml of water are added. A white precipitate is isolated and washed several times. After drying under vacuum, a white powder is obtained (480 mg, yield 83%).

The results of the characterizations of this dendritic structure (PEI-COCH$_2$CH$_2$R$_f$) are the following:

$^1$H NMR (C$_6$F$_6$) δppm: 2.4-3.6 (m, NCH$_2$CH$_2$N and R$_f$CH$_2$CH$_2$CO). $^{13}$C NMR (C$_6$F$_6$) δppm: 27.2 (R$_f$CH$_2$CH$_2$CO) 29.0 (R$_f$CH$_2$CH$_2$CO) 39 (NCH$_2$CH$_2$NHCO) 50-55 (NCH$_2$CH$_2$N) 107-125 (CF$_2$) 173.5 (CH$_2$CONHCH$_2$). IR: N—H stretch 3306 cm$^{-1}$, C=O 1653 cm$^{-1}$, N—H bend 1559 and secondary amines 1451 cm$^{-1}$, C—F 1205, 1149 cm$^{-1}$.

98% of the "primary amine" groups have been transformed, that is to say, 27% of all of the amine functions of the dendritic structure.

b) Synthesis of the Nanoparticles of Palladium (Pd) in PEI-COCH$_2$CH$_2$R$_f$

In a standard experiment, an intimate mixture of PEI-COCH$_2$CH$_2$R$_f$ (100 mg) and of palladium precursor, palladium acetylacetonate (Pd(acac)$_2$-125 mg) is produced. These quantities correspond to a ratio PEI-COCH$_2$CH$_2$R$_f$/Pd(acac)$_2$ (R) of 80. This mixture is then introduced into the reactor described above and subsequently CO$_2$ (5 MPa) and 0.4 MPa of hydrogen are added. The reactor is heated to 100° C., the pressure is brought up to 15 MPa by the addition of CO$_2$ and the reaction mixture is maintained under these conditions for 1 hour. The temperature is then reduced to 40° C. and the reaction mixture is subsequently decompressed. During the decompression phase, the temperature is maintained at 40° C. in order to prevent the CO$_2$ from passing into the liquid domain. After decompression, the temperature is brought back to ambient temperature. This procedure enables a clean and dry black powder to be recovered at the end of the experiment.

Under these conditions (15 MPa, 100° C.), it was verified by IR spectroscopy that the reagents (PEI-COCH$_2$CH$_2$R$_f$ and Pd(acac)$_2$) are not soluble in CO$_2$.

The powder obtained can be re-dispersed in trifluoroethanol, for example, and a stable colloidal solution can be formed. This type of functional nanoparticle can be used to effect biphase catalysis. Various techniques for characterizing the nanomaterials were used: transmission electron microscopy (TEM), electron diffraction, X-ray photoelectron spectroscopy (XPS) and X-ray powder diffraction (XRD).

Figure 2:
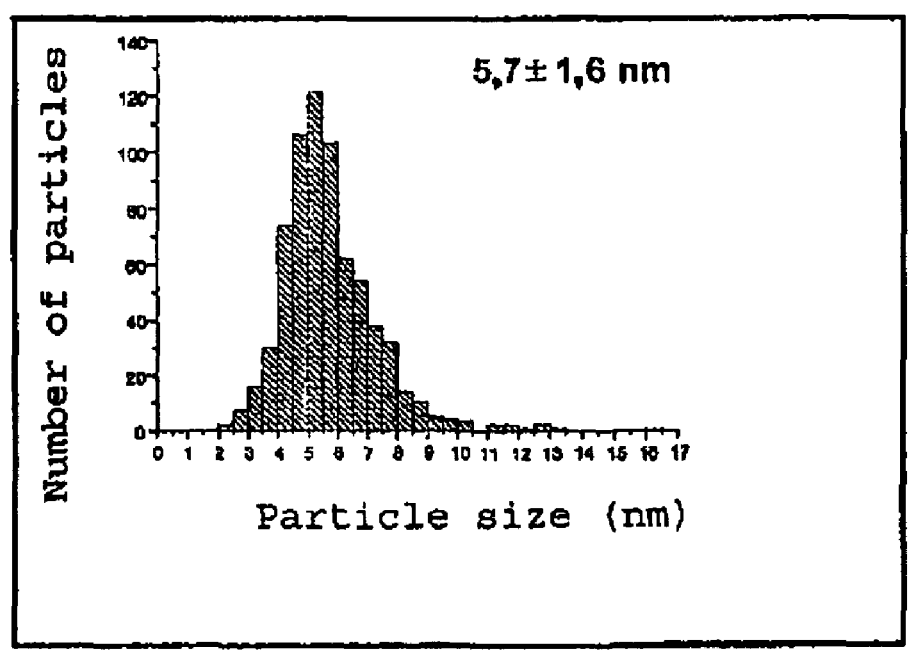
FIG. 2 shows a histogram which represents the particle size (nm) measured by TEM and which has been produced in respect of 690 nanoparticles starting from Pd in PEI-COCH$_2$CH$_2$R$_f$.

FIG. 2 represents a TEM image and the corresponding histogram. FIG. 2 shows that functional palladium nanoparticles having an average size of 5.7 nm have been synthesized. In the absence of PEI-COCH$_2$CH$_2$R$_f$, an agglomeration of the particles is observed: this shows that the dendritic structure enables the nanoparticles to be stabilized.

The nature of the nanoparticles was verified by XPS; XPS analysis shows that it is indeed palladium nanoparticles that have been synthesized.

After a reaction time of 1 hour, XPS analysis shows that a small amount of Pd(acac)$_2$ that has not been reduced still remains. By increasing the residence time in the synthesis reactor to 3 hours, all of the precursor is reduced to metal.

Finally, the structural analyses (XRD and electron diffraction) confirm that metallic palladium having a face-centred cubic structure has indeed been synthesized.

By varying the different process parameters of pressure, temperature, residence time, ratio R and concentration of Pd(acac)$_2$, it is possible to control the size of the palladium nanoparticles functionalized by the dendritic structure from a few nm to a few tens of nm.

c) Synthesis of the Nanoparticles of Silver (Ag) in PEI-COCH$_2$CH$_2$R$_f$

Figure 3:
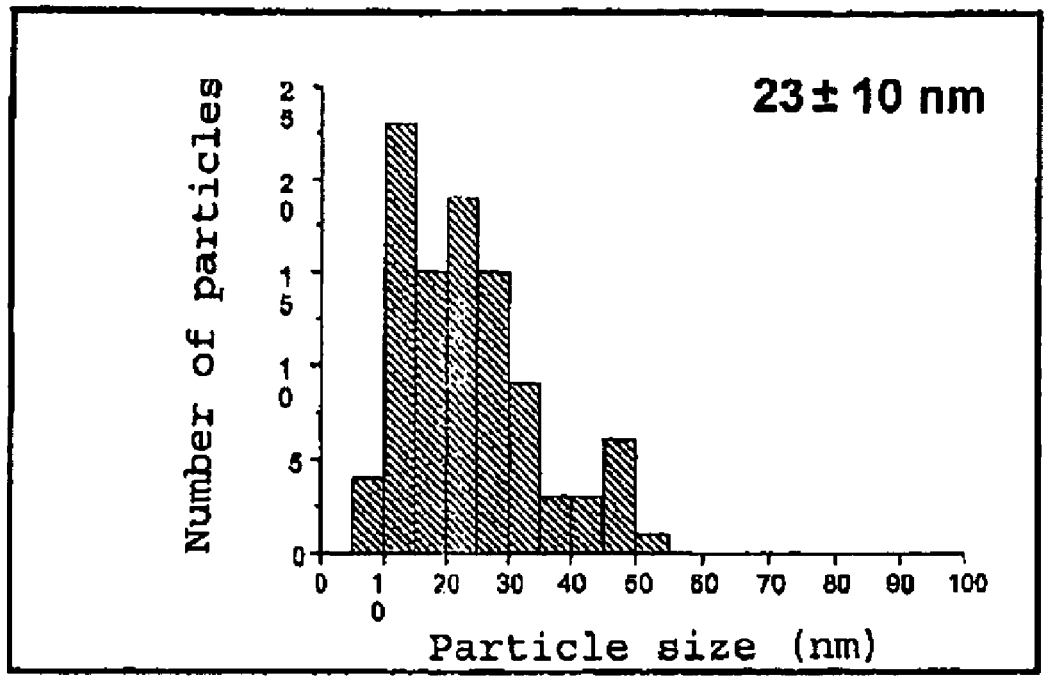
FIG. 3 shows a histogram which represents the particle size (nm) measured by TEM and which has been produced in respect of 100 nanoparticles of Ag in PEI-COCH$_2$CH$_2$R$_f$.

Starting from an intimate mixture of PEI-COCH$_2$CH$_2$R$_f$ (100 mg) and silver precursor, silver acetate (Ag(ac)-67 mg) and the experimental protocol set out for the synthesis of palladium nanoparticles, well-crystallized silver nanoparticles having an average size of 23 nm were obtained (FIG. 3).

The dry and clean powder obtained can be re-dispersed in fluorinated solvents and used, for example, to produce a hydrophobic antibacterial deposit on a surface.

Example 1 shows that the same approach permits the synthesis of different kinds of material stabilized by the same dendritic structure. The differences in size between the nanoparticles of palladium and those of silver can be explained by differences in the kinetics of reduction and growth of the two types of material.

Example 2

Nanoparticles of Pd in DAB Modified with Fluorinated Molecules

In this Example, the dendritic structure used is a fourth-generation dendrimer (core—DAB of molar mass 3500 g/mol modified by fluorinated molecules and cortex—"COCH$_2$CH$_2$R$_f$" with Rf=-(CF$_2$)$_7$CF$_3$). The experimental protocol for modifying the core is the same as that set out in Example 1. 98% of the "primary amine" groups were transformed. The results of characterizations of this dendritic structure (DAB-COCH$_2$CH$_2$R$_f$) are the following:

$^1$H NMR (C$_6$F$_6$) δppm: 2.4-3.6 (m, NCH$_2$CH$_2$N and R$_f$CH$_2$CH$_2$CO). $^{13}$C NMR (C$_6$F$_6$) δppm: 27.2 (R$_f$CH$_2$CH$_2$CO) 29.0 (R$_f$CH$_2$CH$_2$CO) 39 (NCH$_2$CH$_2$NHCO) 50-55 (NCH$_2$CH$_2$N) 107-125 (CF$_2$) 171.7 (CH$_2$CONHCH$_2$). IR: N—H stretch 3303 cm$^{-1}$, C=O 1650cm$^{-1}$, N—H bend 1563, C—F 1204, 1149, 1112 cm$^{-1}$.

It was verified by IR spectroscopy that the dendritic structure, DAB-COCH$_2$CH$_2$R$_f$, is not soluble in CO$_2$ at 15 MPa and 100° C.

Figure 4:
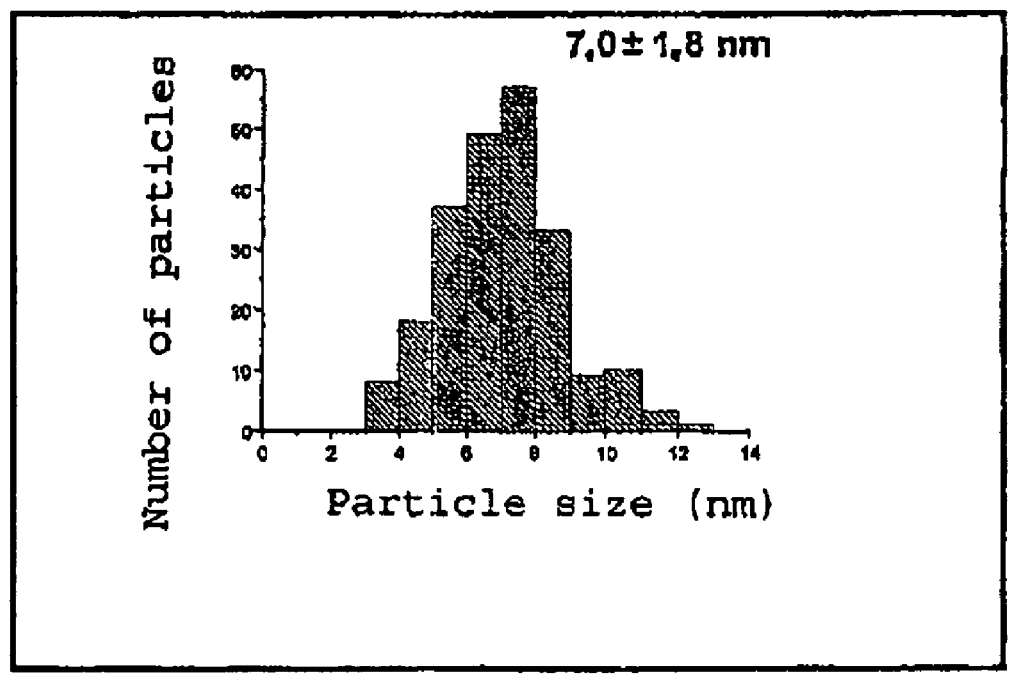
FIG. 4 shows a histogram which represents the particle size (nm) measured by TEM and which has been produced in respect of 226 nanoparticles of palladium in DAB-COCH$_2$CH$_2$R$_f$.

Starting from an intimate mixture of DAB-COCH$_2$CH$_2$R$_f$ (100 mg) and a palladium precursor, palladium acetylacetonate (Pd(acac)$_2$-125 mg) and the experimental protocol set out for the synthesis of palladium nanoparticles in PEI-COCH$_2$CH$_2$R$_f$, well-crystallized palladium nanoparticles having an average size of 7 nm were obtained (FIG. 4).

The palladium nanoparticles stabilized in DAB-COCH$_2$CH$_2$R$_f$ are recovered in the form of a clean dry powder and can be re-dispersed in fluorinated solvents of the trifluoroethanol type for biphase colloidal catalysis.

This Example shows, in comparison with Example 1, that the nature of the core of the dendritic structure has an influence on the final size of the particles (Pd- PEI-COCH$_2$CH$_2$R$_f$→5.7 nm and Pd - DAB-COCH$_2$CH$_2$R$_f$→7.0 nm under the same conditions). The nature of the core probably influences the viscosity of the system under the pressure and temperature conditions studied.

Example 3

Nanoparticles of Pd in Polyethyleneimine Modified with Hydrophobic Molecules

In this Example, the dendritic structure used is a hyper-branched polymer (core-polyethyleneimine (PEI) of molar mass 5000 g/mol) modified by hydrophobic molecules (cortex—"COC$_{15}$H$_{31}$"). The experimental protocol for modifying the core is the same as that set out for the modification of PEI by fluorinated molecules. 98% of the "primary amine" groups were transformed. The results of characterizations of this dendritic structure (PEI-COC$_{15}$H$_{31}$) are the following:

$^1$H NMR (CDCl$_3$) δppm: 0.83 (t, 3H, CH$_3$), 1.22 (m, 24H, CH$_2$) 1.57 (m, 2H, COCH$_2$CH$_2$) 2.11 (m, 2H, COCH$_2$CH$_2$) 2.4-2.8 (m, NCH$_2$CH$_2$N) 3.22 (m, CONCH$_2$CH$_2$N) 3.6 (m, NH). $^{13}$C NMR (CDCl$_3$) δppm: 14.3 (CH$_3$), 22.9, 29.6, 29.9 and 32.1 (CH$_2$), 26.2 (COCH$_2$CH$_2$) 36.7 (COCH$_2$CH$_2$) 33.4

(CONCH$_2$CH$_2$N) 37.7 (CONCH$_2$CH$_2$N) 47.4, 49.0, 51.5, 52.8 and 53.7 (NCH$_2$CH$_2$N) 174.0 (CH$_2$CONHCH$_2$). IR: 1645 cm$^{-1}$.

It was verified by IR spectroscopy that the dendritic structure, PEI-CO C$_{15}$H$_{31}$, is not soluble in CO$_2$ at 15 MPa and 100° C.

Figure 5:
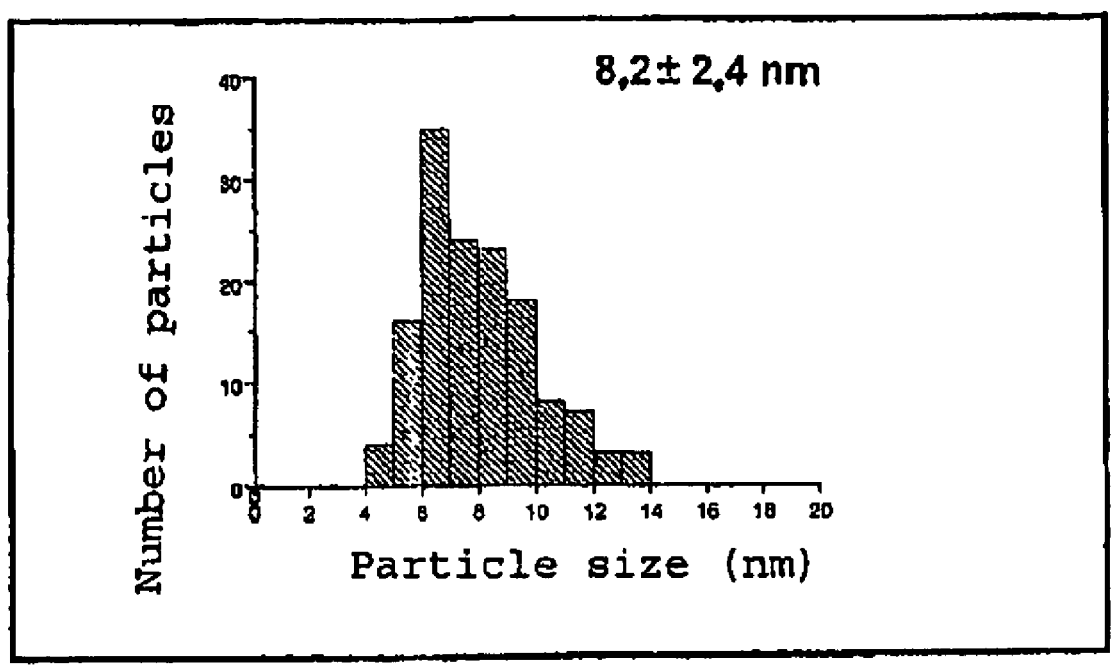
FIG. 5 shows a histogram which represents the particle size (nm) measured by TEM and which has been produced in respect of 146 nanoparticles of palladium in PEI-CO—CH$_2$—(OCH$_2$CH$_2$)$_3$—OCH$_3$.

Starting from an intimate mixture of PEI-COC$_{15}$H$_{31}$ (100 mg) and palladium precursor, palladium acetylacetonate (Pd(acac)$_2$—188 mg) and the experimental protocol set out for the synthesis of palladium nanoparticles in PEI-COCH$_2$CH$_2$R$_f$, well-crystallized palladium nanoparticles having an average size of 8.2 nm, were obtained (FIG. 5).

As in the preceding Examples, the functional nanoparticles are recovered in the form of a clean dry powder redispersible in organic solvents of the toluene type. This type of material can be used for colloidal catalysis.

This Example shows that it is possible, with the same process, to stabilize nanoparticles in dendritic structures functionalized by hydrophobic molecules.

Example 4

Nanoparticles of Pd in Polyethyleneimine Modified with Hydrophilic Molecules

In this Example, the dendritic structure used is a hyperbranched polymer (core-polyethyleneimine (PEI) of molar mass 5000 g/mol) modified by hydrophilic molecules (cortex—"CO—CH$_2$—(OCH$_2$CH$_2$)$_3$—OCH$_3$"). The experimental protocol for modifying the core is different from the preceding protocols. Tetraethylene glycol monomethyl ether (2.08 g, 0.01 mol), potassium hydroxide (1.12 g, 0.02 mol) and potassium permanganate (3.16 g, 0.02 mol) are agitated in 100 ml of water at ambient temperature for 12 hours. The brown precipitate obtained is filtered and then washed several times with water. After reducing the volume of the aqueous solution to 50 ml, the product is extracted with dichloromethane. The organic solution is dried over Na$_2$SO$_4$ and then filtered. The solvent is evaporated and leads to 3,6,9-trioxadodecanoic acid (1.4 g, yield 63%). This oil (1.22 g, 5.5 mmol) dissolved in THF (25 ml) is added gently to a solution of carbonyldiimidazole (842 mg, 5.2 mmol). The reaction mixture is agitated for 1 hour at ambient temperature under a stream of argon in order to remove the CO$_2$. The mixture is then transferred to a beaker containing the hyperbranched polymer (PEI5k, 745 mg, 5.2 mmol of terminal "amino" groups). The reaction is heated at 40° C. overnight, the solvent is evaporated and the product is purified by dialysis in water (1.4 g, yield 80%). 98% of the "primary amine" groups were transformed. The results of characterizations of this dendritic structure (PEI-COCH$_2$(OCH$_2$CH$_2$)$_3$OCH$_3$) are the following:

$^1$H NMR (CDCl$_3$) δppm: 2.4-2.8 (m, NCH$_2$CH$_2$N) 3.33 (s, 3H, OCH$_3$), 3.6 (m, 12H, OCH$_2$CH$_2$O) 3.94 (m, 2H, CO CH$_2$O). $^{13}$C NMR (CDCl$_3$) δppm: 59.2 (CH$_3$), 70-72 (OCH$_2$CH$_2$O), 70 (COCH$_2$O) 37 (CONCH$_2$CH$_2$N) 39.7 (CONCH$_2$CH$_2$N) 47, 49, 52 and 54 (NCH$_2$CH$_2$N) 170.3 (OCH$_2$CONHCH$_2$).

Starting from an intimate mixture of PEI-COCH$_2$ (OCH$_2$CH$_2$)$_3$OCH$_3$ (100 mg) and palladium precursor, palladium acetylacetonate (Pd(acac)$_2$ —203 mg) and the experimental protocol set out for the synthesis of palladium nanoparticles in PEI-COCH$_2$CH$_2$R$_f$, well-crystallized palladium nanoparticles having an average size of 6.1 nm were obtained.

As in the preceding Examples, the functional nanoparticles are recovered in the form of a clean dry powder redispersible in aqueous solvents. This type of material can be used for colloidal catalysis in water. With nanoparticles of the iron oxide type, these materials could be used as MRI contrast agents because the PEG functions around the dendritic core would render them stealthy.

This Example shows that it is possible, with the same process, to stabilize nanoparticles in dendritic structures functionalized by hydrophilic molecules.

REFERENCES

Wilson O. M., Crooks R. M., Synthesis, Characterization, and Applications of Dendrimer-Encapsulated Nanoparticles, Journal of Physical Chemistry B, 2005, 109 (2), 692-704.

Schlotterbeck U., Aymonier C., Thomann R., Hofmeister H., Tromp M., Richtering W., Mecking S., Shape-Selective Synthesis of Palladium Nanoparticles Stabilized by Highly Branched Amphiphilic Polymers, Advanced Functional Materials, 2004, 14, 999-1004.

Garcia-Bernabé A., Krämer M., Olàh B., Haag R., Syntheses and Phase-Transfer Properties of Dendritic Nanocarriers That Contain Perfluorinated shell Structures, Chemistry of European Journal, 2004, 10, 2822-2830.

Cansell F., Aymonier C., Loppinet-Serani A., Review on Materials Science and Supercritical Fluids, Current Opinion in Solid State & Materials Science, 2003, 7, 331-340.

Jung J., Perrut M., Particle Design using Supercritical Fluids: literature and patent survey, Journal of Supercritical Fluids, 2001, 20, 179-219.

Korgel B., Johnston K., Light-emitting nanoparticles and method of making same, WO 03/003982, 2003.

Adischiri T., Takami S., Umetsu M., Ohara S., Tsukada T., Supercritical hydrothermal synthesis of nanoparticles, Ceramic Transactions, 2005,146, 3-10.

Holmes J. D., Lyons D. M., Ziegler K. J., Supercritical Fluid Synthesis of Metal and Semiconductor Nanomaterials, Chemistry—A European Journal, 2003, 9, 2144-2150.

Ye X., Wai C. M., Making Nanomaterials in Supercritical Fluids: A Review, Journal of Chemical Education, 2003, 80 (2), 198-204.

McLeod M. C., Gale W. F., Roberts C. B., Metallic Nanoparticle Production utilizing a Supercritical Carbon Dioxide Flow Process, Lagmuir, 2004, 20 (17), 7078-7082.

Shah P. S., Hanrath T., Johnston K. P., Korgel B. A., Nanocrystal and Nanowire Synthesis and Dispersibility in Supercritical Fluids, Journal of Physical Chemistry B, 2004, 108 (28), 9574-9587.

Satoshi Y., Hiroyuki S., Yuko U., Katsuto O., Kenji H., Atsushi H., Tomoya T., Toshihiko N., Gas separation membrane and method for manufacturing the same, 2004, JP2004275986.

Satoshi Y., Atsushi H., Hiroyuki S., Yuko U., Kenji H, Tomoya T., Katsuto O., Preparation of a platinum and palladium/polyimide nanocomposite film as a precursor of metal-doped carbon molecular sieve membrane via supercritical impregnation, Chemistry of Materials, 2004, 16, 2363 and the publications mentioned as references.

Fahlman B. D., Low temperature synthesis of carbon nanotubes by catalytic decomposition of halogenated hydrocarbons, 2004, WO 2004103904.

Dai L., Low temperature, controlled synthesis of carbon nanotubes, Small, 2005, 1(3), 274.

Goetheer E. L. V., Baars M. W. P. L., Van den Broeke L. J. P., Meijer E. W., Keurentjes J. T. F., Functionalized poly (propylene imine) dendrimers as novel phase transfer catalyst in supercritical carbon dioxide, Industrial & Engineering Chemistry Research, 2000, 39(12), 4634.

R. W. J. Scott, O. M. Wilson, R. M. Crooks, Synthesis, characterization, and application of dendrimer-encapsulated nanoparticles, Journal of Physical Chemistry B, 2005, 109 (2), 692

A. Garcia-Bernabe, M. Kraemer, B. Olah, R. Haag, Syntheses and phase-transfer properties of dendritic nanocarriers that contain perfluorinated shell structures, Chemistry—A European Journal, 2004, 10 (11), 2822; c) U. Schlotterbeck, C. Aymonier, R. Thomann, H. Hofmeister, M. Tromp, W. Richtering, S. Mecking, Shape-Selective Synthesis of Palladium Nanoparticles Stabilized by Highly Branched Amphiphilic Polymers, Advanced Functional Materials, 2004, 14, 999.

Y. H. Kim et O. W. Webster, Macromolecules, vol. 25, pp. 5561-5572 (1992).

F. Cansell, C. Aymonier, A. Loppinet-Serani, Review on materials science and supercritical fluids, Curr. Opin. Solid State Mater. Sci., 2003, 7, 331; b) S. Desmoulins-Krawiec, Elaboration de particules nanostructures de nitrures et d'oxynitrures métalliques en milieu fluide supercritique. Etude et modélisation des mécanismes de croissance des particules (Production of metal nitride and oxynitride nanostructured particles in supercritical fluid medium. Study and modelling of the mechanisms of particle growth), Thesis of the University of Bordeaux I, 2004.

Rainer Haag, Chem. Eur. J., 2004, vol. 10, p. 2822.

Stephan Mecking, Adv. Synt. Catal., 2003, 345, p. 333 and Chem. Commun., 2002, 3018.

E. Meyer, JACS, 1996, 118, 73-98.

Desimone J. M., Nature, 1997, 389, p. 368.

R. M. Crooks, JACS, 1999, 121, p. 4910.

The invention claimed is:

1. Process for the preparation of a particle-based composition, comprising:
   (i) bringing a mixture comprising a dendritic structure and a metal compound precursor into contact with a fluid, under temperature and pressure conditions such that the mixture is not soluble in the fluid; and
   (ii) the chemical transformation of the metal compound precursor.

2. Process of preparation according to claim 1, wherein the process comprises the recovery of the particle-based composition obtained.

3. Process of preparation according to claim 1, wherein the dendritic structure is a hyperbranched polymer or a dendrimer.

4. Process of preparation according to claim 3, wherein the dendritic structure is selected from poly(amidoamines) (PAMAM), polyethylene imines (PEI), poly(propyleneimines) (PPI), and polypropyleneimine dotriacontaamine dendrimers (DAB).

5. Process of preparation according to claim 1, wherein the dendritic structures are modified by hydrophilic or hydrophobic molecules.

6. Process of preparation according to claim 5, wherein the hydrophilic or hydrophobic molecules are selected from:
   RfCOOH, where Rf represents a linear or branched poly- or perfluoroalkyl group;
   Alk-COOH, Alk denoting a linear or branched $C_2$-$C_{20}$ alkyl group;
   polyoxyalkylene glycols or the ethers thereof.

7. Process of preparation according to claim 1, wherein the metal compound precursor is selected from precursors of metals, of semiconductor materials, of metal oxides, or of nitrides.

8. Process of preparation according to claim 7, wherein the precursor is a palladium or silver compound.

9. Process of preparation according to claim 1, wherein the fluid comprises $CO_2$.

10. Process of preparation according to claim 1, wherein the pressure is from 10 to 30 MPa.

11. Process of preparation according to claim 1, wherein the temperature is from 80° to 250° C.

12. Process of preparation according to claim 1, wherein the molar ratio precursor/dendritic structure is from 10 to 200.

13. Process according to claim 1, wherein the chemical transformation is a thermolysis, oxidation-reduction, sol-gel or solvothermal reaction.

14. Process according to claim 13, wherein the chemical transformation is an oxidation-reduction reaction.

15. Process according to claim 14, wherein the oxidation-reduction reaction is carried out in the presence of hydrogen.

16. Particle-based composition that can be obtained in accordance with the process as defined in claim 1.

17. Composition according to claim 16, wherein the particles have an average diameter of from 1 nm to 1 μm.

18. Composition for organic synthesis catalysis, for coating surfaces or for medical imagery comprising a particle-based composition according to claim 16.

* * * * *